No. 806,553. PATENTED DEC. 5, 1905.
W. S. MICHAEL & A. R. ANDERSON.
KETTLE.
APPLICATION FILED JAN. 13, 1905.
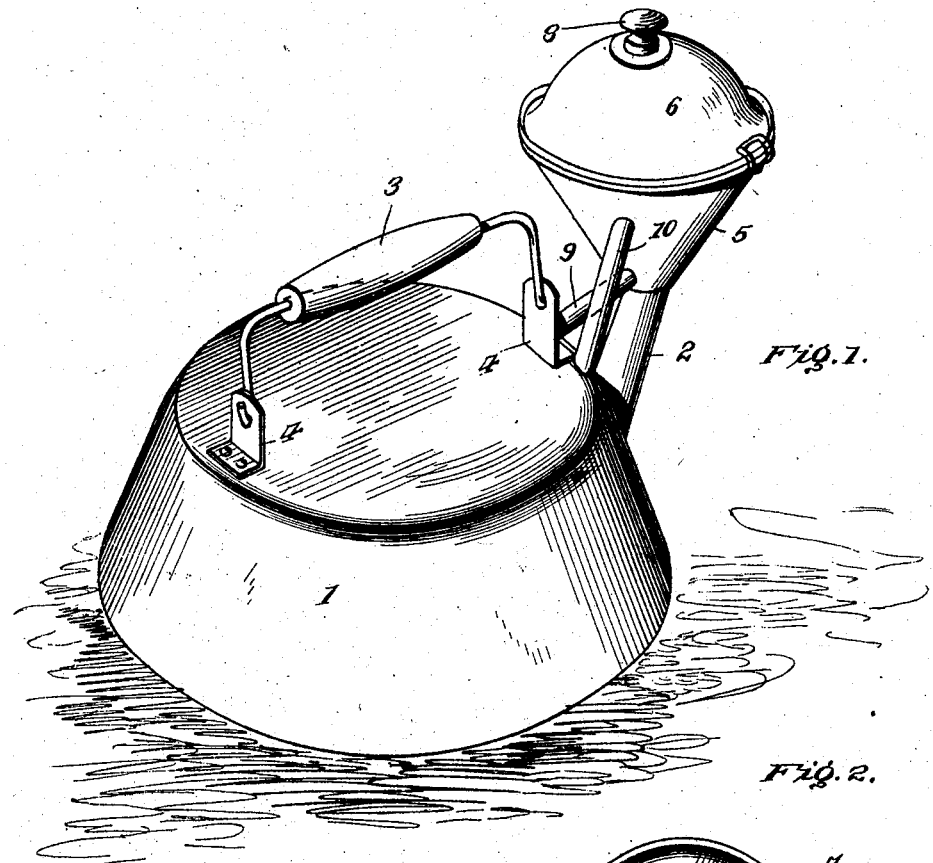
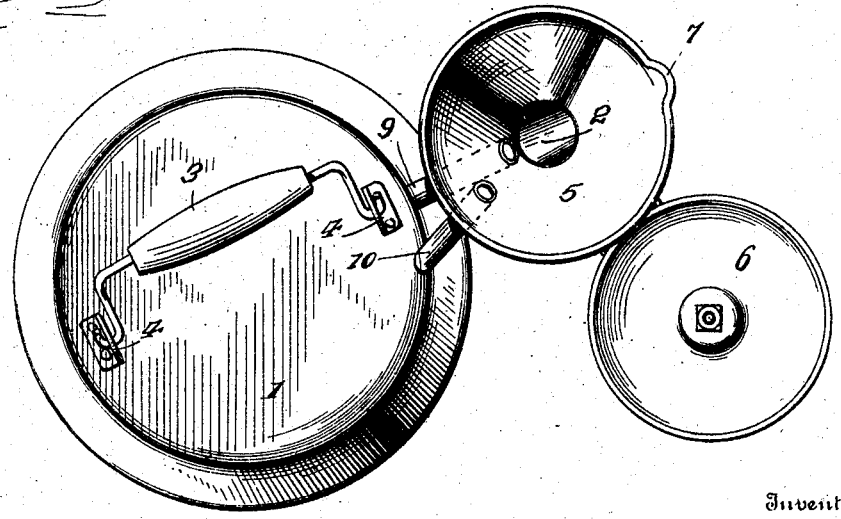
Inventors
Webster S. Michael
Andrew R. Anderson
Witnesses

UNITED STATES PATENT OFFICE.

WEBSTER S. MICHAEL AND ANDREW R. ANDERSON, OF BROOKLYN, NEW YORK.

KETTLE.

No. 806,553.     Specification of Letters Patent.     Patented Dec. 5, 1905.

Application filed January 13, 1905. Serial No. 240,955.

*To all whom it may concern:*

Be it known that we, WEBSTER S. MICHAEL and ANDREW R. ANDERSON, citizens of the United States, residing at Brooklyn, in the county of Kings and State of New York, have invented certain new and useful Improvements in Kettles, of which the following is a specification.

It is well known that in handling the common form of kettle for boiling water the hands are often burned, due to displacement of the cover of the kettle or escape of steam or from similar cause. The use of a cover for a kettle is disadvantageous in that the same is located near the handle of the kettle and is in the way, likely to be lost, and necessitates filling of the receptacle at an inconvenient portion of the body thereof.

This invention provides a receptacle of the class above mentioned, doing away with the use of a cover, obviating the likelihood of scalding the hands of the user, and simplifying the general structure of the device generally.

For a full description of the invention and the merits thereof and also to acquire a knowledge of the details of construction of the means for effecting the result reference is to be had to the following description and accompanying drawings.

While the invention may be adapted to different forms and conditions by changes in the structure and minor details without departing from the spirit or essential features thereof, still the preferred embodiment thereof is shown in the accompanying drawings, in which—

Figure 1 is a perspective view of a kettle embodying the essential features of the invention. Fig. 2 is a top plan view.

Corresponding and like parts are referred to in the following description and indicated in both the views of the drawings by the same reference characters.

A kettle constructed in accordance with this invention is in general form substantially the same as those now in common use and consists of a body or receptacle 1, entirely closed with the exception of an opening in the side thereof, from which extends a spout 2. The receptacle 1 is not provided with a cover, as ordinarily employed, the handle 3 thereof, however, being of the usual bail formation and pivotally attached to lugs 4, extending upwardly from the top of the receptacle. The spout 2 is of special formation, being provided at its upper extremity with a funnel-shaped extension 5 of greater capacity than the spout. The cover 6 is pivoted to the extension 5 of the spout 2 and normally closes this spout under ordinary conditions of service. In the upper portion of the funnel-shaped extension 5 of the spout 2 said extension may be pressed or bulged outwardly, as shown at 7, to form a pouring-lip of common form. A knob or smaller handle 8 is provided for the cover 6 of the spout 2. In order to attach the spout to the body of the kettle, the extension 5 is connected therewith by tubes 9 and 10, which not only serve as a reinforcement for the spout 2, but the said tubes afford passages in communication with the spout and receptacle 1.

The tube 10 extends from the upper portion of the body 1 of the kettle to a point between the upper and lower extremities of the funnel-shaped extension 5 of the spout, and this spout affords an escape for the steam generated in the kettle, said steam passing from the receptacle at a point where it is not likely to scald or injure one who is grasping the handle 3. The area of the extension 5 conduces also to condensing of the steam upon the sides thereof, so that much of the steam will not pass off through the receptacle, but when condensed will pass back into the body 1 thereof.

It will be noted that the extension of the spout forms a receptacle well adapted to receive eggs or the like in order to steam the same for eating purposes. A filter may be disposed near the lower end of the extension aforesaid. The receptacle 1 is of course filled through the spout, and the extension forms a funnel which facilitates the replenishing of the kettle in an obvious manner.

Having thus described the invention, what is claimed as new is—

A kettle consisting of a closed receptacle, a spout communicating with the receptacle and leading therefrom at a side thereof, said spout being provided with a funnel-shaped extension at its upper end, tubes connecting the funnel-shaped extension with the upper portion of the body of the receptacle, and a handle at the top of the receptacle.

In testimony whereof we affix our signatures in presence of two witnesses.

WEBSTER S. MICHAEL. [L. S.]
    ANDREW R. ANDERSON. [L. S.]

Witnesses:
 LILLIAN KEMP,
 ROBERT McILWAINE.